(12) United States Patent
Eckleder et al.

(10) Patent No.: US 8,320,733 B2
(45) Date of Patent: Nov. 27, 2012

(54) METHOD OF PREPARING DVD-VIDEO FORMATTED DATA, METHOD FOR RECONSTRUCTING DVD-VIDEO DATA AND DVD-VIDEO DATA STRUCTURE

(75) Inventors: Andreas Eckleder, Karlsbad (DE); Richard Lesser, Karlsruhe (DE); Olivier Zacek, Karlsbad (DE)

(73) Assignee: Nero AG, Karlsbad (DE)

( * ) Notice: Subject to any disclaimer, the term of this patent is extended or adjusted under 35 U.S.C. 154(b) by 2161 days.

(21) Appl. No.: 11/262,366

(22) Filed: Oct. 28, 2005

(65) Prior Publication Data
US 2006/0165381 A1 Jul. 27, 2006

Related U.S. Application Data

(63) Continuation of application No. PCT/EP2005/010740, filed on Oct. 5, 2005.

(30) Foreign Application Priority Data

Jan. 25, 2005 (EP) ..................................... 05001420

(51) Int. Cl.
*H04N 5/765* (2006.01)
(52) U.S. Cl. ...................................... 386/232
(58) Field of Classification Search .................... 386/125
See application file for complete search history.

(56) References Cited

U.S. PATENT DOCUMENTS 7,133,598 B1 * 11/2006 Lin et al. ........................ 386/232
7,159,233 B2 * 1/2007 Son et al. ........................ 725/86
2003/0043847 A1 * 3/2003 Haddad ......................... 370/473
2003/0061369 A1 3/2003 Aksu et al.
2003/0110229 A1 6/2003 Kulig et al.
2004/0136698 A1 7/2004 Mock

OTHER PUBLICATIONS

The First DVD Player in the World to Play Back Nero Digital Files to be Launched Today. Neroportal Press Release. Dec. 7, 2004.
Pereira, F., et al. The MPEG-4 Book. Prentice Hall PTR. New Jersey. 2002.
Herpel, C., et al. Transporting and Storing MPEG-4 Content. Chapter 7.
Korean Office Action Dated Aug. 25, 2008 citing: Kwak, et al.; "Design and Implementation of RTP payload format for MPEG-4 Video Streams"; 2001; The Korea Information Processing Society Fall Conference 2001, vol. 8, No. 2, pp. 1501-1504.

* cited by examiner

*Primary Examiner* — William C. Vaughn, Jr.
*Assistant Examiner* — Daniel Tekle
(74) *Attorney, Agent, or Firm* — Michael A. Glenn; Glenn Patent Group

(57) ABSTRACT

For converting a first representation of a media content into a second representation of the media content, a data entity builder is used, which generates a data entity being the second representation of the media content. The data entity builder generates a second representation indicator, at least one regenerated media file and a payload data schedule, the payload data schedule having schedule information indicating, for each regenerated media file, the start of the payload information of the media file. The regenerated media file represents the same media content as represented by the original media file in the first representation.

19 Claims, 12 Drawing Sheets

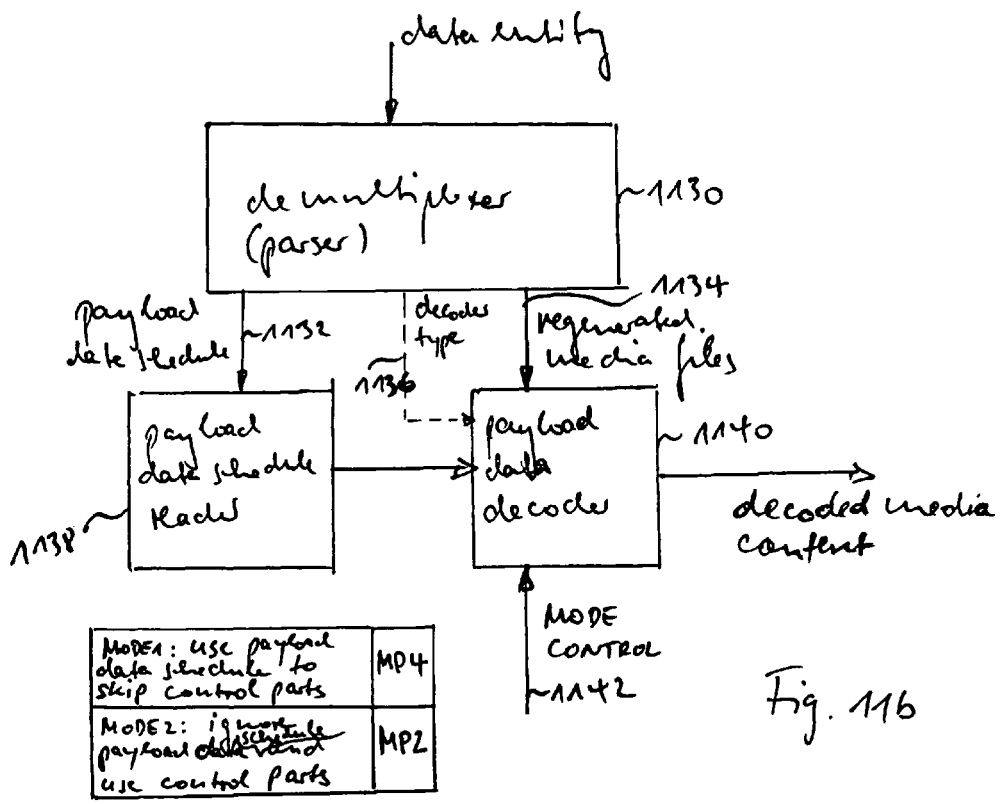

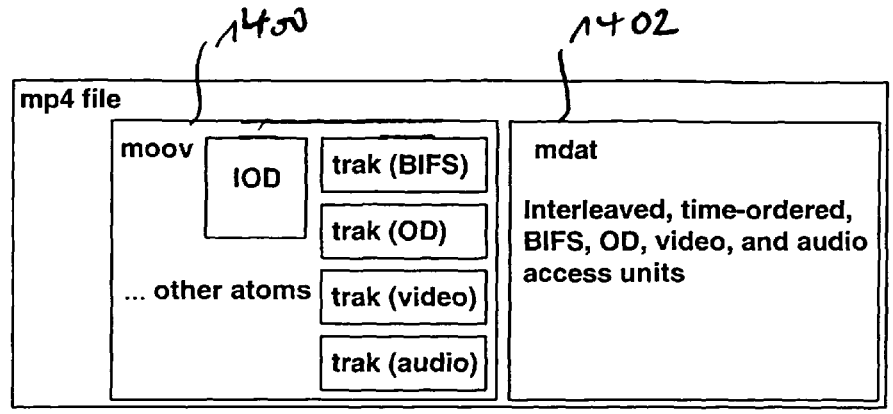

from ISO/IEC 14496-1:2002

Fig. 14

Overview of Atom Encapsulation Structure

| Moov | | | | | | | | |
|---|---|---|---|---|---|---|---|---|
| | | | | | * | 13.2.3.1 | container for all the meta-data |
| | mvhd | | | | | * | 13.2.3.3 | movie header, overall declarations |
| | iods | | | | | | 13.2.3.4 | object descriptor |
| | trak | | | | | * | 13.2.3.5 : | container for an individual track or stream |
| | | tkhd | | | | * | 13.2.3.6 | track header, overall information about the track |
| | | tref | | | | | 13.2.3.7 | track reference container |
| | | edts | | | | | 13.2.3.25 | edit list container |
| | | | elst | | | | 13.2.3.26 | an edit list |
| | | mdia | | | | * | 13.2.3.8 | container for the media information in a track |
| | | | mdhd | | | * | 13.2.3.9 | media header, overall information about the media |
| | | | hdlr | | | * | 13.2.3.10 | handler, at this level, the media (handler) type |
| | | | minf | | | * | 13.2.3.11 | media information container |
| | | | | vmhd | | | 13.2.3.12.1 | video media header, overall information (video track only) |
| | | | | smhd | | | 13.2.3.12.2 | sound media header, overall information (sound track only) |
| | | | | hmhd | | | 13.2.3.12.3 | hint media header, overall information (hint track only) |
| | | | | <mpeg> | | | 13.2.3.12.4 | mpeg stream headers |
| | | | | dinf | | * | 13.2.3.13 | data information atom, container |
| | | | | | dref | * | 13.2.3.14 | data reference atom, declares source(s) of media in track |
| | | | | stbl | | * | 13.2.3.15 | sample table atom, container for the time/space map |
| | | | | | stts | * | 13.2.3.16.1 | (decoding) time-to-sample |
| | | | | | ctts | | 13.2.3.16.2 | composition time-to-sample table |
| | | | | | stss | | 13.2.3.21 | sync (key, I-frame) sample map |
| | | | | | stsd | * | 13.2.3.17 | sample descriptions (codec types, initialization etc.) |
| | | | | | stsz | * | 13.2.3.18 | sample sizes (framing) |
| | | | | | stsc | * | 13.2.3.19 | sample-to-chunk, partial data-offset information |
| | | | | | stco | * | 13.2.3.20 | chunk offset, partial data-offset information |
| | | | | | stsh | | 13.2.3.22 | shadow sync |
| | | | | | stdp | | 13.2.3.23 | degradation priority |
| mdat | | | | | | | 13.2.3.2 | Media data container |
| free | | | | | | | 13.2.3.24 | free space |
| skip | | | | | | | 13.2.3.24 | free space |
| udta | | | | | | | 13.2.3.27 | user-data, copyright etc. |

Fig. 15      from ISO/IEC 14496-1:2002

13.2.3.19 Sample to Chunk Atom

Atom Type: 'stsc'
Container: Sample Table Atom ('stbl')
Mandatory: Yes
Quantity: Exactly one Samples within the media data are grouped into chunks. Chunks may be of different sizes, and the samples within a chunk may have different sizes. By using this table, you can find the chunk that contains a sample, its position, and the associated sample description.

The table is compactly coded. Each entry gives the index of the first chunk of a run of chunks with the same characteristics; by subtracting one entry here from the previous one, you can compute how many chunks are in this run. You can convert this to a sample count by multiplying by the appropriate samples-per-chunk.

13.2.3.19.1 Syntax

```
aligned(8) class SampleToChunkAtom
   extends FullAtom('stsc', version = 0, 0) {
   unsigned int(32)   entry-count;
   int i;
   for (i=0; i < entry-count; i++) {
      unsigned int(32)   first-chunk;
      unsigned int(32)   samples-per-chunk;
      unsigned int(32)   sample-description-index;
   }
}
```

13.2.3.19.2 Semantics version - is an integer that specifies the version of this atom.
entry-count - is an integer that gives the number of entries in the following table.

first-chunk - is an integer that gives the index of the first chunk in this run of chunks that share the same samples-per-chunk and sample-description-index.
samples-per-chunk - is an integer that gives the number of samples in each of these chunks.
sample-description-index - is an integer that gives the index of the sample entry that describes the samples in this chunk. The index ranges from 1 to the number of sample entries in the Sample Description Atom.

Fig. 16    from ISO/IEC 14496-1: 2002

13.2.3.20 Chunk Offset Atom

Atom Type: 'stco'
Container: Sample Table Atom ('stbl')
Mandatory: Yes
Quantity: Exactly one The chunk-offset table gives the index of each chunk into the containing file. There are two variants, permitting the use of 32-bit or 64-bit offsets. The latter is useful when managing very large presentations. At most one of these variants will occur in any single instance of a sample table.

Note that offsets are file offsets not the offset into any atom within the file (e.g. a Media Data Atom). This permits referring to media data in files without any atom structure. It does also mean that care must be taken when constructing a self-contained mp4 file with its meta-data (Movie Atom) at the front, as the size of the Movie Atom will affect the chunk offsets to the media data.

13.2.3.20.1 Syntax

```
aligned(8) class ChunkOffsetAtom
   extends FullAtom('stco', version = 0, 0) {
   unsigned int(32)   entry-count;
   int i;
   for (i=0; i < entry-count; i++) {
      unsigned int(32)   chunk-offset;
   }
} aligned(8) class ChunkLargeOffsetAtom
   extends FullAtom('co64', version = 0, 0) {
   unsigned int(32)   entry-count;
   int i;
   for (i=0; i < entry-count; i++) {
      unsigned int(64)   chunk-offset;
   }
}
```

13.2.3.20.2 Semantics

> version - is an integer that specifies the version of this atom.
> entry-count - is an integer that gives the number of entries in the following table.
> chunk-offset - is a 32 or 64 bit integer that gives the offset of the start of a chunk into its containing media stream (file).

Fig. 17 from ISO/IEC 14496-1: 2002

METHOD OF PREPARING DVD-VIDEO FORMATTED DATA, METHOD FOR RECONSTRUCTING DVD-VIDEO DATA AND DVD-VIDEO DATA STRUCTURE

CROSS-REFERENCE TO RELATED APPLICATION

This application is a continuation of copending International Application No. PCT/EP2005/010740, filed on Oct. 5, 2005, which designated the United States.

BACKGROUND OF THE INVENTION

1. Field of the Invention

The present invention relates to a method of preparing DVD-Video formatted data, preferably of a movie, for transmission from a server to a client, wherein the DVD-Video formatted data are provided as a set of predetermined data files. The present invention also relates to a method used in a DVD-apparatus for reconstructing DVD-Video data prepared according to the afore-mentioned method. Further, the invention relates to a DVD-Video data structure comprising a set of data files containing video, audio and rich content data and organized according to the DVD-Video specification. Further, the invention relates to a record carrier for use in a DVD-player and a DVD-apparatus for playing video films stored on a record carrier, comprising reading means for reading data stored on said record carrier, means for processing DVD-Video formatted files and decoding means for decoding e.g. mpeg-4 encoded data. Finally, the invention relates to a computer program product and a computer program including hardware and software for consumer electronic devices.

2. Description of the Related Art

In the past, offering and buying of digital content, like music (mp3 music stores, for example) became more and more popular and has developed to a considerable business. This growth of business was supported by an increase in bandwidth of Internet connections allowing to download digital content in shorter times on the one hand side, and the development of simple and easy to use players for playing the downloaded content on the other hand side. However, the still limited bandwidth of Internet connections has prevented a further growth of content distribution over the Internet with respect to video content, e.g. the distribution of video content is still carried out in the form of DVD media on which the video content is stored in correspondence with the DVD-Video specification.

As it is known in the art, the DVD-Video format allows to incorporate rich content, meaning sub-picture data, like subtitles, etc., navigation information, etc.

Commonly, the video and audio data is encoded according to the mpeg-2 or mpeg-1 standard and encapsulated in data packets which are part of the DVD-Video formatted data structure.

Due to the fact that the available Internet bandwidths increase continuously with a reduction of costs, downloading of videos, movies, etc. is becoming more popular. However, simple downloading of mpeg-2 encoded or mpeg-4 encoded video streams is not desired, since the user would in this case need special software to bring the mpeg-2/4 data stream into the DVD-Video format necessary for producing a DVD-Video disc.

For example, there is a need for a simple and easy to use solution for downloading DVD-Video formatted video content. Additionally, it is desirable to be able to store a DVD on a CD or on a hard disk, when one has for example the wish to store an originally bought DVD in a safe place and to only use a copy of the DVD.

While the DVD format has a directory structure having certain files in a video-title set (Video_TS) directory, and the actual video or audio content is included in video object files (VOB-Extension File), and the actual video content is again preceded by pack headers and PES packet headers, there exist other formats requiring video data to be written without any interspersed control information.

Such a file format is the MPEG-4 file format as defined in the international standard ISO/IEC 14496-1:2002. Particularly, section 13 "file format" of part 1 "systems" of this MPEG-4 standard is of particular relevance. Here, the audio or video data are required to be written into a so-called "mdat" atom. The MPEG-4 standard requires that the data in this mdat atom is data in so-called chunks, i.e., data which only represent payload data constituting an audio or video or, generally, a media content without any packet control information there between. Stated in other words, an MPEG-4 conforming decoder which is also called a "legacy" decoder in this document assumes that the mdat atom only includes group of picture chunks, i.e., a video-encoded group of picture data relating to subsequent groups of pictures. One exception provided for by MPEG-4 is that an mdat atom can include several tracks, which means that one can include for example several movies into a single MPEG-4 container. When the MPEG-4 player is to play the first movie or the first track, then a correct starting point in the mdat atom is searched for (this starting point can be an address or a certain sector boundary on a storage medium), and the data starting at this starting point and immediately subsequent data are decoded until all data of this chunk is completely decoded.

In contrast thereto, as stated above, the MPEG-2 file format, which is the DVD file format is different from this MPEG-4 file philosophy, since there exist several files, where each file includes control information, and since, within a single file, groups of picture data are not written subsequently but a group is normally preceded by certain headers including control information. Therefore, on a regular DVD, the data is not written in chunks, but is packed in so-called PES packets (PES=Program Elementary Stream).

Furthermore, because of the DVD file size restriction, video objects can be separated into two or even more video object files. It ist to be noted in this context that a title set includes titles having the same attributes such as an aspect ratio. When a movie in 16:9 is to be written on the DVD, and when a makeof in 4:3 is to be written on the DVD, then two title sets for the DVD have to be generated.

In the meantime, DVD players have become more and more popular. This means that there exist many home or professional users possessing a DVD player connected to a television set. Thus, the regular user is accustomed to her or his DVD/television set combination.

As stated before, increasing the available internet bandwidth allows to distribute movies not only via DVDs, which can be sold in a certain store, but also allow to download a complete movie against a fee paid by the movie recipient. However, the DVD format requiring several separate files is not very well suited for a comfort download via the internet. Instead, a simple to use and comfortable procedure is required, which allows the complete order and deliverance of any file format from the internet using a single click of the user.

Furthermore, an error-free and safe download can better be guaranteed for the user, which cannot be guaranteed in all cases, when a single data entity instead of several different data entities has to be downloaded via the Internet or any other net such as a wireless net.

Furthermore, as outlined above, it is a disadvantage, when additional steps by the user are required to reconstruct a file structure of a DVD disc in order to feed the internet-downloaded data into a DVD player separate from the computer, i.e., connected to the television set.

SUMMARY OF THE INVENTION

It is the object of the present invention to provide a concept for handling representations of audio or video content having one or more files, in which payload data blocks are separated by control data, which is comfortable for a user and suited for an internet download.

In accordance with a first aspect, the present invention provides an apparatus for converting a first representation of a media content into a second representation of the media content, the first representation including a media file having at least two media file payload blocks separated by a media file control block or at least two media files each media file having a media file payload block and a media file control block, the media file payload blocks representing the media content, the media file control blocks including control information for associated media file payload blocks, the apparatus having a data entity builder for generating a data entity, the data entity being the second representation of the media content, the file builder being operative to regenerate the one or more media files so that in a regenerated media file or in regenerated media files a regenerated media file control part is located between two regenerated media file payload parts; and to generate a payload data schedule, the payload data schedule having schedule information indicating, for each regenerated media file payload block, a start of payload information of the regenerated media file payload block.

In accordance with a second aspect, the present invention provides a method of converting a first representation of a media content into a second representation of the media content, the first representation including a media file having at least two media file payload blocks separated by a media file control block or at least two media files each media file having a media file payload block and a media file control block, the media file payload blocks representing the media content, the media file control blocks including control information for associated media file payload blocks, the method having the steps of generating a data entity, the data entity being the second representation of the media content, regenerating the one or more media files so that in a regenerated media file or in regenerated media files a regenerated media file control part is located between two regenerated media file payload parts; and generating a payload data schedule, the payload data schedule having schedule information indicating, for each regenerated media file payload block, a start of payload information of the regenerated media file payload block.

In accordance with a third aspect, the present invention provides a data entity representing a media content, the data entity having a representation indicator identifying a data entity type; a regenerated media file or a plurality of regenerated media files, in which a regenerated media file control part is located between two regenerated media file payload parts; and a payload data schedule, the payload data schedule having schedule information indicating, for each regenerated media file payload block, a start of payload information of the regenerated media file payload block.

In accordance with a fourth aspect, the present invention provides a media processor for processing a data entity having a representation indicator identifying a data entity type, a regenerated media file or a plurality of regenerated media files, in which a regenerated media file control part is located between two regenerated media file payload parts, and a payload data schedule, the payload data schedule having schedule information indicating, for each regenerated media file payload block, a start of payload information of the regenerated media file payload block, having a payload data schedule reader for reading the payload data schedule information; and a payload data decoder for decoding the regenerated media file or the plurality of regenerated media files, wherein the payload data decoder is operative to be controlled based on the payload data schedule information, so that the payload data decoder decodes the two regenerated media file payload parts, and so that the payload data decoder skips the regenerated media file control part located between the two regenerated media file payload parts.

In accordance with a fifth aspect, the present invention provides a media processing method for processing a data entity having a representation indicator identifying a data entity type, a regenerated media file or a plurality of regenerated media files, in which a regenerated media file control part is located between two regenerated media file payload parts, and a payload data schedule, the payload data schedule having schedule information indicating, for each regenerated media file payload block, a start of payload information of the regenerated media file payload block, the method having the steps of reading the payload data schedule information; and decoding the regenerated media file or the plurality of regenerated media files, by decoding the two regenerated media file payload parts, and skipping the regenerated media file control part located between the two regenerated media file payload parts.

In accordance with a sixth aspect, the present invention provides a computer program for performing, when running on a computer, the method of converting a first representation of a media content into a second representation of the media content, the first representation including a media file having at least two media file payload blocks separated by a media file control block or at least two media files each media file having a media file payload block and a media file control block, the media file payload blocks representing the media content, the media file control blocks including control information for associated media file payload blocks, the method having the steps of generating a data entity, the data entity being the second representation of the media content, regenerating the one or more media files so that in a regenerated media file or in regenerated media files a regenerated media file control part is located between two regenerated media file payload parts; and generating a payload data schedule, the payload data schedule having schedule information indicating, for each regenerated media file payload block, a start of payload information of the regenerated media file payload block.

In accordance with a seventh aspect, the present invention provides a computer program for performing, when running on a computer, the media processing method for processing a data entity having a representation indicator identifying a data entity type, a regenerated media file or a plurality of regenerated media files, in which a regenerated media file control part is located between two regenerated media file payload parts, and a payload data schedule, the payload data schedule having schedule information indicating, for each regenerated media file payload block, a start of payload information of the regenerated media file payload block, the method having the steps of reading the payload data schedule information; and decoding the regenerated media file or the plurality of regenerated media files, by decoding the two regenerated media file payload parts, and skipping the regenerated media file control part located between the two regenerated media file payload parts.

The present invention is based on the finding that in scenario, in which the first representation includes a media file having at least two media file payload blocks separated by a media file control block or at least two media files each media file having a media file payload block and a media file control block, the media file payload blocks representing the media content, the media file control blocks including control information for associated media file payload blocks, a data entity builder generates a data entity, the data entity being the second representation of the media content, by regenerating the one or more media files so that in a regenerated media file or in regenerated media files a regenerated media file control part is located between two regenerated media file payload parts and by generating a payload data schedule, the payload data schedule having schedule information indicating, for each regenerated media file payload block, a start of payload information of the regenerated media file payload block. Thus, the original file structure is maintained and a device accustomed to the second format can simply skip the control blocks and play the media content without any additional information.

The present invention is advantageous in that a single data entity is generated, which serves as a second representation of the media content, which, in a first representation thereof was including several files. Alternatively, when the first representation includes a single file, the present invention is advantageous in that, due to the payload data schedule, the payload data included in the newly generated data entity can be read and processed by a device expecting un-interrupted payload data, i.e., payload data not interrupted by control data.

The present invention, therefore, provides a single data entity which can be downloaded via the internet easily and error-free. Additionally, due to the payload data schedule information, the media payload data can be processed by a device which can not process any control data between payload data blocks.

Additionally, the first representation is included within the second representation, since, preferably, the at least one regenerated media file has the same structure as the original media file.

Preferably, the first representation of the media content is a DVD representation having several files and, additionally, having program elementary streams within the video object units, wherein the program elementary streams have control information and group of picture video information. In this embodiment, the data entity builder generates an MPEG-4 container, which includes a copy of the original DVD format, and, which, in addition, includes the payload data schedule indicating the start of each block of payload information. This has the advantage that a decoder, which is in conformity with MPEG-4, and, therefore, expects video data chunks not separated by control data blocks can use the payload information for skipping control data between the payload data so that a DVD format can easily be parsed by an MPEG-4 conforming decoder. Stated in other words, the additional information included in additional files of the DVD format or included in headers for the group of picture payload data are skipped by a legacy player so that compatibility is guaranteed. Preferably, the player will start e.g. at the beginning of the main movie, which beginning is defined during conversion by setting the first entry of the data payload schedule accordingly. An enhanced player such as a MPEG-4/DVD device is capable of understanding the interspersed control data blocks. It is important to note that a regular DVD-Video player will never be able to play MPEG-4 H.264 encoded content. A video player can be easily built, however, capable of playing MPEG-4 content interspersed with DVD-Video navigation data. Thus, the MPEG-4 container can easily be unpacked after receipt via the internet so that a user can easily burn her or his own DVD to be output by the computer and to be input into a regular DVD player requiring the original DVD file structure.

Preferred embodiments are subsequently described. The invention provides for a method of preparing DVD-Video formatted data as mentioned in the outset which allows easy access and downloading of video content while maintaining the advantages of the DVD-Video format, namely the incorporation of rich content into the raw mpeg-1/2 audio/video stream. This object is, for example, solved by a method of preparing DVD-Video formatted data as mentioned above, comprising the steps of: reading the data out of the files in a predetermined order; and writing the read data in a single file, wherein the order of the read data given by the predetermined order of the files is maintained and the start address of a file directly follows the end address of the previous file without any gap.

In other words, the predetermined files containing video, audio and rich content data and structured according to the DVD-Video specification are all stored in a single file. The original order of the files, which is also part of the DVD-Video specification, is maintained in the single file, and the beginning of a file within the single file directly follows the end of the previous file. In the context of this invention, the expressions "directly follows" or "without any gap" have the meaning that there is no substantial address gap between succeeding files (E.g. a gap which is solely caused by technical requirements of the storing medium itself would not be a substantial gap). For efficient storage, there is no substantial or considerable empty address room between two files within the single file. If required, padding data for padding until the start of the next sector are used.

Further, in the context of this invention, "DVD" means every optical storing medium like DVD, HD-DVD, BD (Blu-Ray-Disc) and every future optical storing medium adapted to store large amounts of multimedia-data, like video etc.

It is apparent that the advantage of a single file containing DVD-Video formatted data is that such files may be stored, shared or downloaded from web pages more easily, in contrast to downloading a plurality of different files as specified in the DVD-Video specification. The user has just to download one single file. No other decompression, like un-zip etc., must be carried out, rather the file is ready for instant playback.

Preferably, the set of files comprises the files VIDEO_TS.IFO, VIDEO_TS.VOB, VIDEO_TS.BUP, VTS_xx_0.IFO, VTS_xx_y.VOB, VTS_xx_ 0.BUP, where xx and y are decimal digits. These files corresponding to the DVD-Video specification are used to store rich content, like title numbers, subtitles, etc., as well as the audio/video data encoded in mpeg-2.

In a preferred embodiment of the invention, the single file carrying DVD-Video content is embedded in an mp4-formatted file. Preferably, the data of the single file is placed into the "mdat" atom of the mp4-file structure.

In other words, the mp4-file structure, as for example disclosed in the mpeg-4 specification, is used as a container for receiving the single file which in turn serves as a container for storing DVD-Video formatted data.

The advantage of these measures is that the up-to-date mp4-file format may be used without giving up the possibility of incorporating rich content as known from the DVD-Video file format.

In a further preferred embodiment, the logical start address of the "mdat" atom relative to the start address of the mp4-file is aligned on a 2048 Bytes boundary.

As it is known, 2048 Bytes is the size of one sector on a DVD, and the smallest unit with respect to seeking operation of the video head reading a DVD.

Placing the "mdat" atom on a 2048 Bytes boundary has the advantage of faster operation when seeking the "mdat" atom.

In a further preferred embodiment, the single file is stored in the "mdat" atom starting on a logical address being the next 2048 Bytes boundary relative to the start address of the mp4-file, wherein preferably the space between the start address of the "mdat" atom and the start address of the data of the single file is padded with "0" bytes.

In other words, the single file is placed (with its first data) on a 2048 Bytes boundary, so that the procedure of finding the beginning of the "mdat" atom and, more particularly, the single file is improved. For example, the beginning of the "mdat" atom is found and the beginning of the "mdat" atom may then be calculated just by rounding up the address to the next 2048 Bytes boundary.

In a preferred embodiment, the payloads of all audio/video PES packets contained in the single file are referenced in the sample table (reference table) of the audio and video tracks of the mp4-file.

As it is described in the mpeg-2 specification and the DVD-Video specification, PES packets are these data packets containing the elementary stream data representing the audio and video information. By preparing such a reference table containing references to PES packets, it is possible to reconstruct the audio and video elementary streams.

This measure has the advantage that a player not supporting rich content may also be able to playback the video by using the reference table and the references therein, respectively.

In a further preferred embodiment, all navigation packs are padded to a 2048 Bytes boundary.

This measure has the advantage that the seeking performance is improved since the data following the navigation packs starts on a 2048 Bytes boundary and may then be found quickly.

In a further preferred embodiment, the DVD-Video formatted data containing navigation packs as part of video object units (VOBUs), and said navigation packs are referenced by a crypto track within the "moov" atom of the mp4-file.

More preferably, the track comprises a reference table containing one reference for each navigation pack and includes pack header, system header and packet headers of the navigation packs.

Downloaded video content, for example, contains a digital rights management (DRM) which serves to protect the downloaded content against illegal copying and distribution. In DVD-Video formatted data structure, the audio/video data contained in a video object unit (VOBU) is encoded with a key, which is in turn stored in the navigation pack assigned to the VOBU. In other words, each VOBU has its own key assigned for decoding the video/audio data. Hence, without access to the navigation pack and more specifically to the key stored in this navigation pack, the video/audio data contained in the PES packets may not be decoded and may, hence, not be played.

The provision of said crypto track has the advantage, that the navigation packs and the respective keys stored therein may be accessed via the references stored in the crypto track, so that the keys may be read and used for decoding the audio/video data.

In a further preferred embodiment, mpeg-4 encoded audio/video content is stored in a DVD-Video container, and the "provider unique ID" field of the video manager management table of the DVD-Video is divided in two subfields, one subfield for storing information whether the DVD-Video contains mpeg-4 content, and the second subfield for storing an address for a second "first play PGC" used if mpeg-4 content is detected.

First of all, this measure means that the mpeg-2 encoded data stored in the PES packets is replaced with respective mpeg-4 encoded data, but of course it can also be kept in mpeg-2. This measure itself has the advantage that the more powerful mpeg-4 coding may be used, however, without giving up the possibility of also providing rich content known from the DVD-Video format. The address for the second "first play PCG" is used if the respective player does not support mpeg-4 codecs; instead, the second "first play PGC" directs to data used for example to play a still picture or any other information saying that the DVD-player does not support mpeg-4 content.

The single file prepared by any method mentioned above may be reconstructed by a method wherein the data contained in the single file is separated into the predetermined set of data files by using the relative address references in each data file referencing to the start address of an adjacent data file.

Here, it is to be noted that the set of files specified in the DVD-Video format specification each contains relative address references referencing to other files. This inherent information may now be used for reconstructing or restoring the DVD-Video data files. It is only necessary to find the beginning of the single file which also corresponds to the beginning of the first DVD-Video file, namely the file VIDEO_TS.IFO. The remaining files contained in the single file may be found by the relative addresses mentioned above.

In a further preferred embodiment, the single file contained in the "mdat" atom is obtained by passing the mp4-file as to obtain the start address of the "mdat" atom and by rounding up the addresses to the next 2048 Bytes boundary, which is the start address of the first data file, namely the VIDEO_TS.IFO file.

As already mentioned before, the single file stored in the "mdat" atom is placed on a 2048 Bytes boundary (relative to the start address of the whole mp4-file), so that it is easy to locate the single file within the "mdat" atom by seeking the start of the "mdat" atom and then round up the address to the next 2048 Bytes boundary. This calculated address is then the start address of the first data file, namely the VIDEO_TS.IFO file.

In a further preferred embodiment, the references in the sample table of the audio and video track are used to access video and audio data contained in the referenced PES packets if said DVD-apparatus does not support rich content, as to reconstruct the movie.

This measure has the advantage that each PES packet is referenced in the audio and video track, so that it is possible to reconstruct the video and audio streams by using these references. These references may be used if the DVD-apparatus does not support rich content.

In a further preferred embodiment, the references in said crypto track are used to access data contained in the referenced navigation packs if said DVD-apparatus does not support rich content. More preferably, each referenced navigation pack contains a decoding key for decoding the payload of the PES packets belonging to the same VOBU, and said decoding key is read and used to decode the read PES payload of said VOBU, particularly audio and video data.

In other words, if the DVD-apparatus does not support rich content, it is still possible to playback the video since the apparatus is able to access the decoding keys stored in the navigation packs by using the references in the crypto track.

In a further preferred embodiment, said single file is copied onto a CD or DVD medium by creating a DVD-Video compliant UDF1.02 file system and by writing fragments of said single file contiguously on said medium, said fragments having any size.

Since all content is stored within one single file, the limitation of DVD-Video file systems in respect to the maximum size of files (the ISO 9660 file system, for example requires files not larger than 2 Giga Byte) will be replaced by the rule that any number of fragments per file entry is allowed but fragments have to be physically adjacent (contiguous). So basically, no fragmentation of the files is allowed on optical storage media. This allows for very simple file system driver stacks.

The object of the present invention is also solved by a DVD-Video data structure comprising a set of data files containing video/audio and rich content data and organized according to the DVD-Video specification, wherein said set of data files is contained in one single video file, said data files being organized in said single file without any free address space between succeeding data files.

The advantages described above with respect to the method according to the present invention are also valid for this DVD-Video data structure so that a further description may be omitted.

In a preferred embodiment, some files of said set of data files contain mpeg-4 encoded video/audio information.

The advantage of this measure is that the more powerful mpeg-4 encoding may be used without giving up the advantages of the DVD-Video format, that is well-understood and commonly used in the industry.

In a further preferred embodiment, said data structure is an mp4-container structure containing at least an "moov" atom and an "mdat" atom, wherein said "mdat" atom contains said single file.

The mp4-container structure itself is known in the art and, for example, described in the ISO14496 standard, the content of which is herewith incorporated by reference herein. The single file corresponding to a DVD-Video data structure is stored within the "mdat" atom. This measure allows to use the widely used DVD-Video data structure within the new mp4-container structure. Hence, this measure allows a combination of both container structures.

In a further preferred embodiment, said single file begins on a 2048 Bytes boundary relative to the beginning of the mp4-file structure.

More preferably, a track atom containing reference data referencing each video/audio frame stored in PES packets within a group of pictures (GOP; structure of a video object unit (VOBU)).

More preferably, each PES packet containing a fragment of a frame (frame fragment) is additionally stored together with remaining frame fragment and said reference data of said track atom reference said additionally stored frame data.

According to the DVD-Video specification, a PES packet may have a maximum length of $2^{16}$ Bytes. However, the length of a frame may exceed this maximum length, so that only a data fragment of the frame may be stored in one PES packet. Due to the fact that the track atom contains reference data which may only reference to one frame or an integer multiple of a frame, the frame fragments are stored as raw data in addition to the PES packets. Therewith it is possible that the reference data in the track atom references to a frame.

In a further preferred embodiment, a crypto track atom containing reference data referencing each navigation pack within each VOBU for accessing key data stored in a navigation pack and necessary for decoding encoded video/audio data stored in the assigned PES packets is provided.

The object of the invention is also solved by a record carrier for use in a DVD-player, characterized in that a data structure as mentioned above is written on said record carrier. Preferably, the record carrier is provided as a DVD medium.

The object of the present invention is also solved by a DVD-apparatus for playing a video film stored on a record carrier, comprising reading means for reading data stored on said record carrier, means for processing DVD-Video formatted files, and decoding means for decoding mpeg-4 and/or mpeg-2 encoded data, wherein the DVD-apparatus further comprises separation means for separating the set of data files stored in said single file of the DVD-data structure as mentioned above.

In a preferred embodiment, said separation means is adapted to read said single file out of the "mdat" atom of the mp4-container structure.

More preferably, said separation means is adapted to find the start address of the "mdat" atom and to round up the address to the next 2048 Bytes boundary relative to the beginning of the mp4-container structure as to read said single file.

It is also preferred that the DVD-apparatus comprises a first referencing means adapted to read said reference data contained in said track atom and to read the video/audio data contained in the referenced PES packets.

More preferably, the DVD-apparatus comprises a second referencing means adapted to read said referencing data contained in said crypto track atom and to read the key data contained in the referenced navigation packs of each VOBU, and a decoding means adapted to decode the read video/audio data of a VOBU by using the read key data assigned to said VOBU.

In a further preferred embodiment, said decoding means is further adapted to decode the read key data by using a main key provided by a license server.

Further features and advantages can be taken from the following description and the enclosed drawings.

It is to be understood that the features mentioned above and those yet to be explained below can be used not only in the respective combinations indicated but also in other combinations or in isolation, without leaving the scope of the present invention.

BRIEF DESCRIPTION OF THE DRAWINGS

Embodiments of the invention are shown in the drawings and will be explained in more detail in the description below with reference to same. In the drawings:

FIG. 11b illustrates a schematic diagram of an inventive media processor;

FIG. 12 indicates a preferred embodiment of a payload data schedule;

FIG. 14 illustrates a preferred embodiment of the single data entity in the form of an MP4-file;

FIG. 15 illustrates an overview of the atom encapsulation structure used in MPEG-4;

FIG. 16 illustrates the MPEG-4 description of the sample to chunk atom; and

FIG. 17 illustrates the MPEG-4 description of the chunk offset atom.

DESCRIPTION OF THE PREFERRED EMBODIMENTS

In the following description of the invention, a plurality of technical terms are used which are defined in the mpeg-2 or mpeg-4 ISO specifications. The respective content of these specifications is therefore incorporated herewith by reference herein. Further, the present invention relates to the DVD-Video data structure and the mp4-container structure, which are also defined in publicly available papers. For example, the mp4-container structure is described in the mpeg-4 specification mentioned above. The DVD-Video specification is available from the DVD Forum (www.dvdforum.org). Further information about mpeg-2 and mpeg-4 may be found in the book "The mpeg-4 book", Fernando Pereira et al., Prentice Hall PTR, 2002, the content of which is also incorporated herein by reference herewith. Finally, the detailed information about applicants mpeg-4 codecs, called "Nero Digital", may be found on the Internet page www.nerodigital.com. This information is also incorporated herein by reference herewith.

Traditionally, Nero Digital content is stored in so-called mp4-containers. For online distribution of pre-mastered content, a new technology is needed to allow rich content presentation as users are accustomed to from DVD-Video discs. The Nero Digital-DRM (digital rights management) content storage format, which will be described below, has been designed to meet the following desirable goals for both content producers and content consumers, namely easy access to content (read-access), easy production (write-access), low development costs for CD devices supporting rich content, rich content at superb quality combined with quick downloads and little space consumption, and backward compatibility to mpeg-4, Nero Digital, capable players not supporting rich content.

Figure 1:
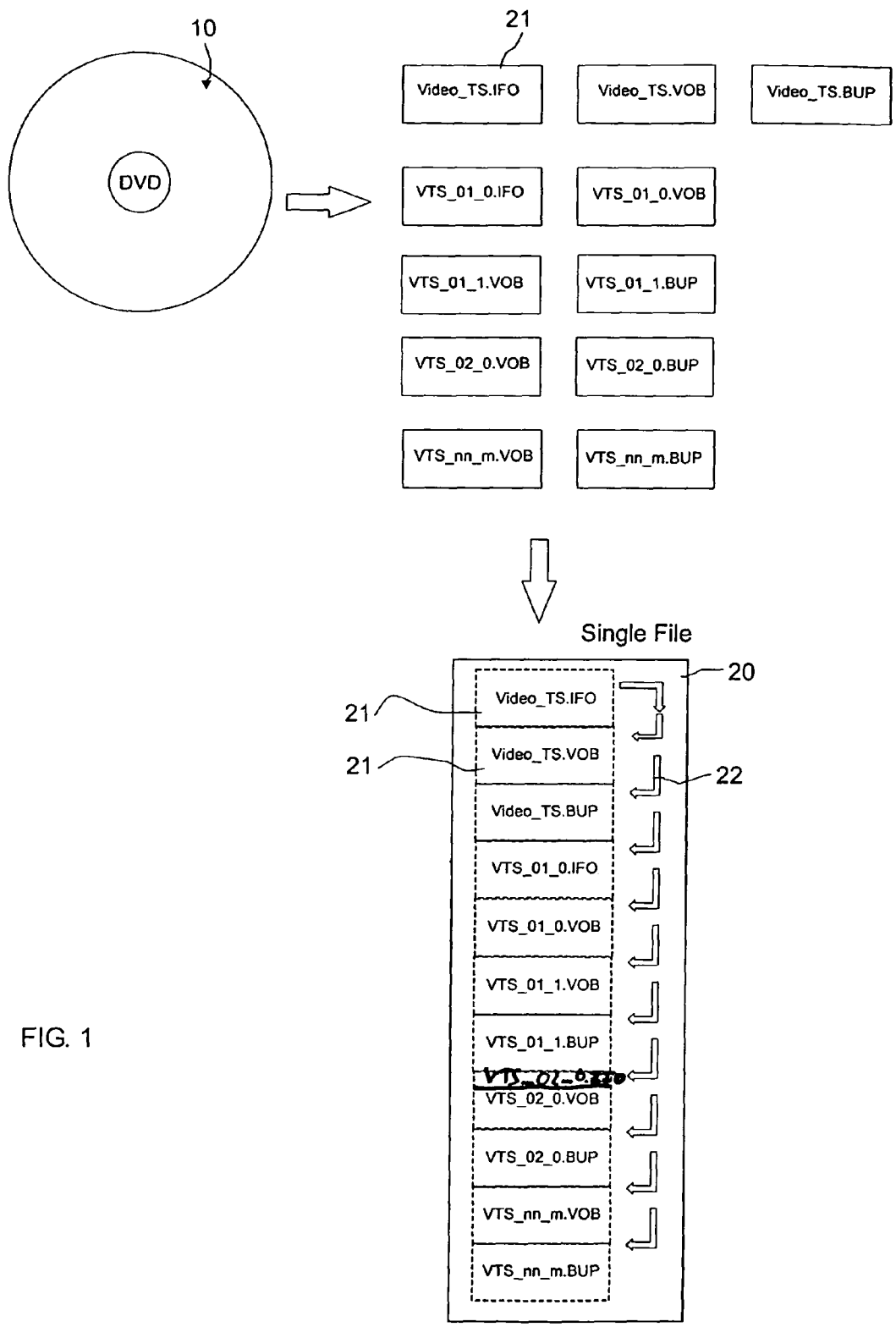
FIG. 1 schematically illustrates a DVD disc and the DVD-Video formatted data stored thereon.

In FIG. 1, the structure of the known DVD-Video container format is schematically shown in the upper half. The DVD-Video container format describes its content through a number of designated files. Namely, these files are VIDEO_TS.IFO, VIDEO_TS.VOB, VIDEO_TS.BUP, VTS_nn_0.IFO, VTS_nn_m.VOB, and VTS_nn_0.BUP, where nn and m are integers equal or greater than zero. These files are stored on a DVD-Video medium 10 contiguously and in a certain, clearly defined order. This order is specified in the above-mentioned DVD-Video specification.

Generally, a DVD-Video disc includes a Video_TS directory, in which the audio/video and metadata and, additionally, further data such as control data are included. The term "TS" stands for title set. The directory Video_TS must include a Video_TS.IFO file, which includes the VMGI (Video Manager Information) structure. The VMGI includes information regarding number and location of the separate titles on the DVD and, additionally, includes control information for the main menu. A back-up of the VMGI is included in the file Video_TS.BUP (VMGI_BAK).

The audio/video data of the main menu are located in the file Video_TS.VOB. In case of a DVD not including a main menu, this file can be missing. The data in Video_TS.VOB are known as VMGM (Video Manager Menu).

A DVD-Video disc can include several title sets. A title set is a group of several titles having the same characteristics such as resolution, audio tracks, etc. such as the main movie and the end part of the movie as an example for a title set 1 or a first trailer and a second trailer as an example of a title set 2. Each of these title sets consists of three parts. The title set has the VTSI (Video Title Set Information) part, a VTSM (Video Title Set Menu) part and VTS_TT (Video Title Set Titles) parts.

The VTSI is included in the file VTS_nn_0.IFO, and nn indicates the title set number. The VTSI table includes control information and a more detailed description of the titles in the title set such as an information, where the chapters are located, where audio tracks are present, etc. A back-up of the VTSI (VTSI_BAK) is included in the VTS_nn_0.BUP file.

All audio/video data of the menu for the titles (Audio-Menu, Sub-Picture-menu, Chapter-Menu, . . . ) in the title set is included in the VTSM (Video Title Set Menu) part. The VTSM data are included in the file VTS_nn_0.VOB, nn being as a title set number. When menus are not present, this file can be missing.

The audio/video data, i.e., payload of the titles, is included in the files starting with VTS_nn_1.VOB. The last number in the file name is the file number, and nn is the title set number. In view of the fact that the UDF file system is hard to parse for a consumer device, a restriction has been introduced for DVD-Video media that only one single extent may exist per file. The maximum file size of the ISO9660 file system is 2 GB. The 1 GB limitation does in fact come from the intent to avoid having more than one extent per file as dealing with extents makes seeking much more complicated. As the size of a single extent is, thus, limited to ~1 GB, the audio/video data of the title, which can often be larger than 1 Gigabyte is divided into several files. Data in the files VTS_nn_1.VOB, VTS_nn_2.VOB, VTS_nn_3.VOB, . . . are physically adjacent on the DVD. This means that e.g. a sector after the last sector in the VTS_nn_1.VOB is the first sector of VTS_nn_2.VOB (VOB=Video Object).

It is to be noted that the mentioned files contain relative address references referencing to other files. Hence, all designated files of the DVD-Video format are linked with each other via relative address references.

Multiple files describing the content of a DVD-Video are advantageous in view of the complexity of the UDF file system driver, since no file will ever grow larger than a predetermined extent (1 Gigabytes). However, with respect to downloading purposes, such a plurality of files is rather inconvenient for the user when downloading from the Internet.

In FIG. 1, one approach for making the download process more convenient is shown. According to this approach, the plurality of files are concatenated together and combined into one big content file, which is indicated with reference numeral 20. This single file 20 comprises all files representing a DVD-Video. The sequence of the files in the single file 20 corresponds to the sequence specified in the DVD-Video specification. Maintaining this sequence allows to use the address references in the files for restoring the original set of DVD-Video files. Particularly, the only file entry point required for playback of the DVD-Video is the beginning of the VIDEO_TS.IFO file, which is also the beginning of the new single file 20. By processing this file, the start addresses of the following files may be calculated on the basis of the address references stored therein (relative logical block numbers within a flat address space).

In FIG. 1, it is indicated by arrows 22 that the files contain address references to other files.

The advantage of this single file is that it may be downloaded very easily via the Internet. Since the single file does not need any additional information necessary for separating and restoring the original files 21, the procedure for building this single file is simple.

Figure 2:
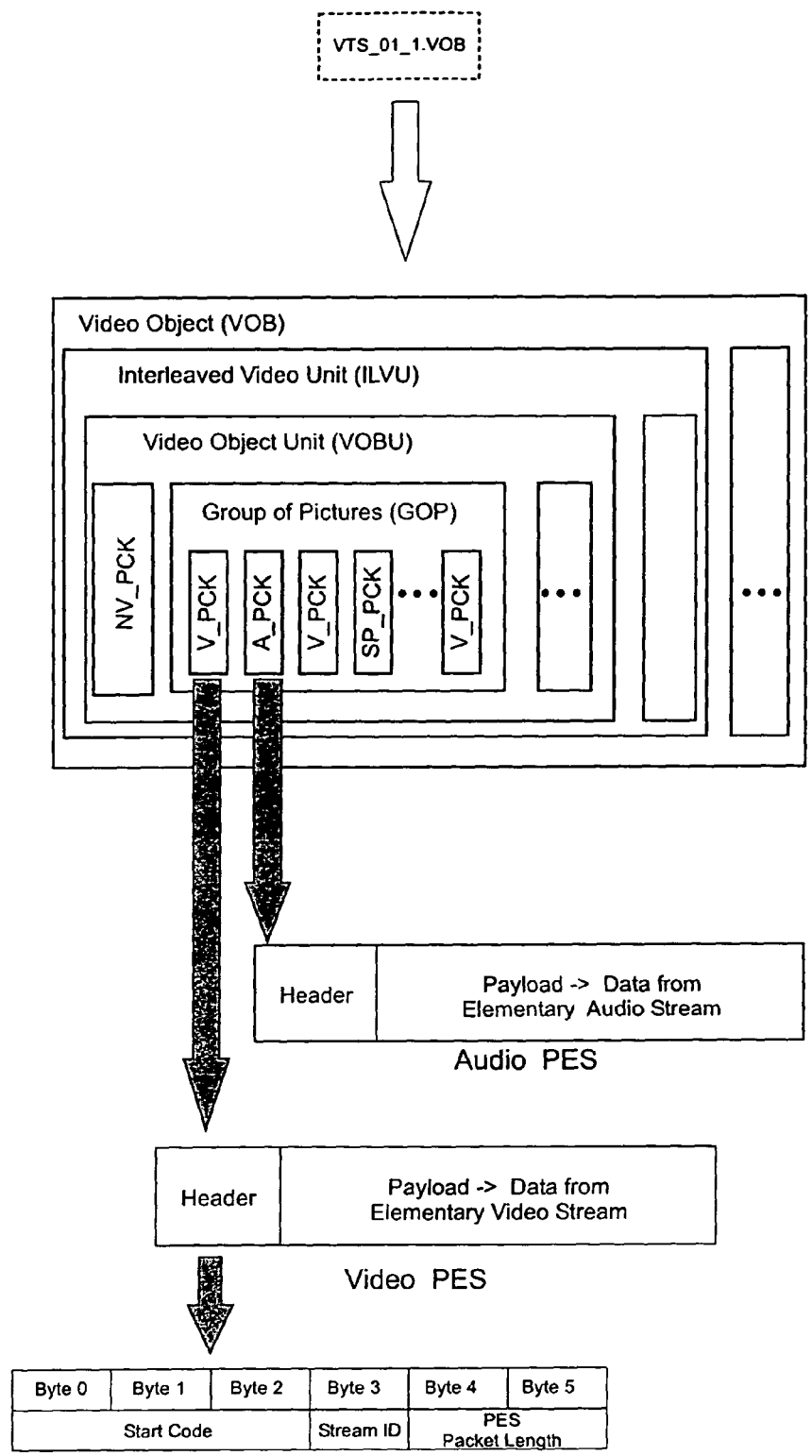
FIG. 2 schematically illustrates the logical data structure of a DVD-Video VOB-file.

In FIG. 2, the logical data structure of a ".VOB" is schematically shown.

A so-called VOB-file is comprised of interleaved video units (ILVU) which, in turn, comprise one or more video object units (VOBU). Each video object unit VOBU comprises a navigation pack (NV_PCK) containing jump marks and timing information, and one or more so-called groups of pictures (GOP). A group of pictures GOP comprises video packs (V_PCK), audio packs (A_PCK) and subtitle packs (SP_PCK) which represent the real video, audio and subtitle data.

A video object unit is the smallest unit entity which may be controlled by a DVD-player. The group of pictures contain the data to be decoded, wherein a group of pictures starts with a so-called I-frame and ends before the next I-frame (see mpeg-2 specification).

As it is shown in FIG. 2, a video pack V_PCK comprises a so-called video PES packet (program elementary stream), a PES packet being represented by a packet header and a payload. The payload contains the data from the elementary video or audio stream, namely the frames to be displayed by the DVD-player. As already mentioned, this data is mpeg-2 encoded.

The VOB-file structure shown in FIG. 2 is generally known and part of the DVD-Video specification, so that further details of this structure will not be described herein.

Figure 3:
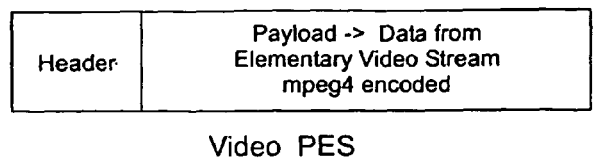
FIG. 3 schematically shows a video PES packet.

Referring now to FIG. 3, a single video PES packet is shown. In contrast to the DVD-Video format, the data of the payload are not mpeg-2 encoded but mpeg-4 encoded.

This is a very effective way of creating rich mpeg-4 content by reusing the concepts deployed by the DVD-Video format. In other words, this approach provides a way of encapsulating mpeg-4 content within the DVD-Video format.

The basic principle of this approach is to encapsulate the audio and video stream into an mpeg-2 system specification compliant program stream (PS) which is then used instead of the traditional mpeg-2 audio/video stream to represent the content of a DVD-Video disc. mpeg-4 DVD-Video supports all resolutions that are multiples of 16 pixels. High-definition formats are also possible.

One advantage of using mpeg-4 encoded data instead of mpeg-2 encoded data is a significant reduction of storage space necessary for storing the video and audio data. For example, mpeg-4 encoding allows to record a video on a CD-ROM instead of a DVD-disc.

Figure 4:
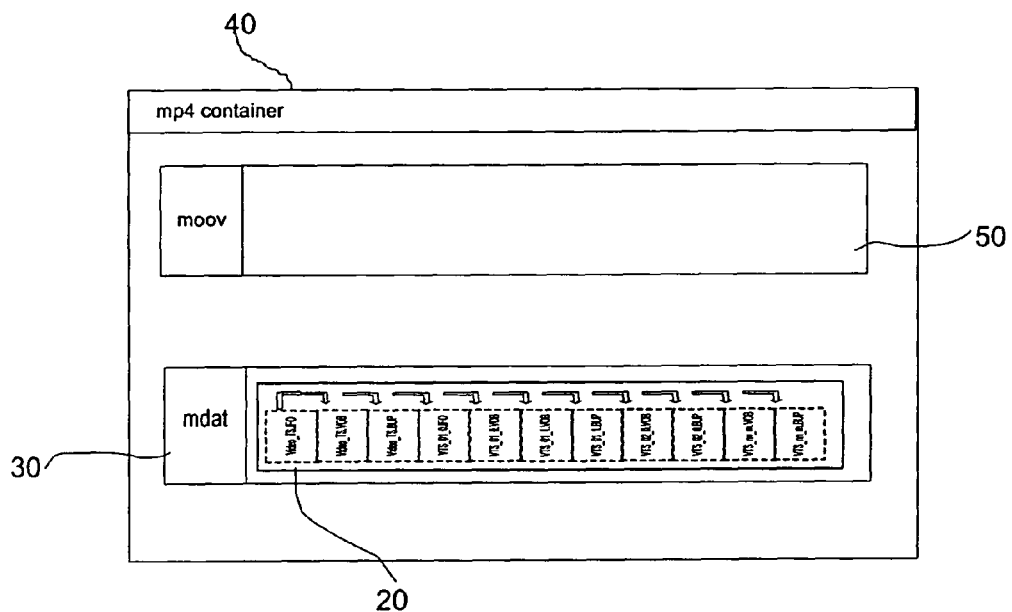
FIG. 4 schematically shows parts of the logical mp4-container data structure.

Referring to FIG. 4, the logical structure of an mp4-container is partially shown. For further details, it is referred to the mpeg-4 specification and the mp4-container format described therein.

In the present embodiment, the single file 20 comprising all the DVD-Video files is placed into the "mdat" atom 30 of the mp4-container 40. However, the single file DVD-Video content is not referenced by any track within the "moov" atom 50.

Figure 5:
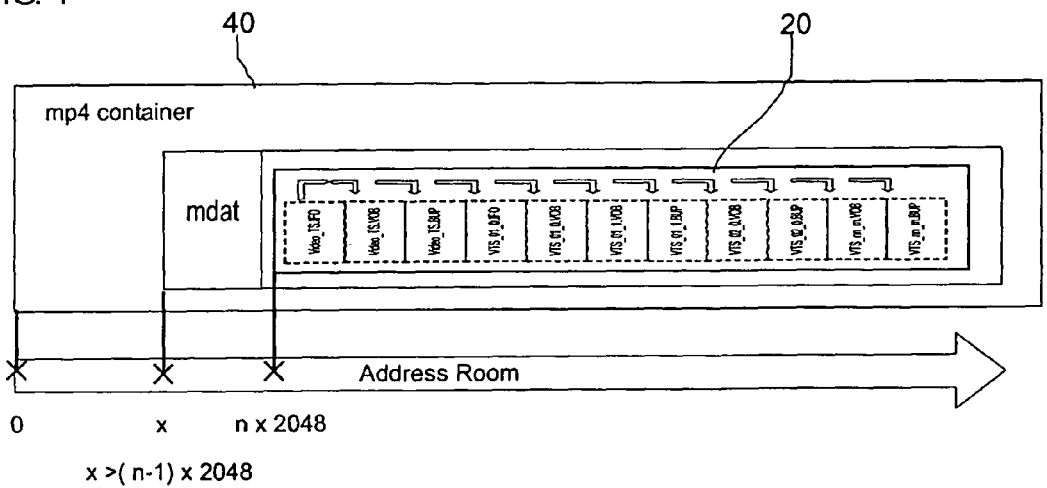
FIG. 5 schematically shows the "mdat" atom of the mp4-container in relation to the address room.

The single file 20 and, hence, the DVD-Video content is aligned within the "mdat" atom 30 on a 2048 Bytes boundary relative to the beginning of the mp4-container file 40. This ensures sector-based seeking operations. To accomplish this kind of alignment, the single file 20 has to be padded up to the next 2048 Bytes boundary with 0 bytes. An example of such an alignment is shown in FIG. 5. For example, if the "mdat" atom starts at relative address x (relative to the start address of the mp4-container file 40), the single file 20 is stored starting with the address, which is the next 2048 Bytes boundary following the "mdat" address x. The space between the end of the "mdat" atom header and the start address of the single file 20 is padded up (filled with) 0-bytes.

This alignment has the advantage that a player supporting menu-based enriched Nero Digital content must only parse the mp4-container 40 to obtain the beginning of the "mdat" atom. This value, rounded up to the next 2048 Bytes boundary is the entry point for the DVD-Video navigator; it is the beginning of the VIDEO_TS.IFO file of an ordinary DVD-Video.

A useful extension to DVD-Video content stored within an mp4-container 40 is the option to reference the main movie of the DVD-Video content through the mp4-container "moov" atom 50. This enables legacy players not supporting rich content to playback the main movie of an enriched Nero digital title.

Figure 6:
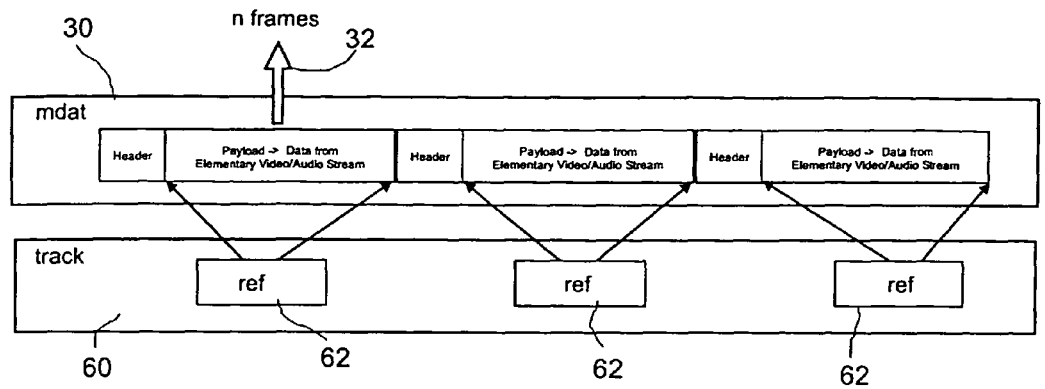
FIG. 6 schematically shows the "mdat" atom and a track atom referencing PES packets in the "mdat" atom.

In FIG. 6, a data structure for accomplishing this goal is shown.

In the "mdat" atom 30 storing the single file 20 and hence—in the lowest logical level—PES packets, only these packets are shown for illustrating purposes only.

As already mentioned before, each PES packet comprises a header portion and a payload portion. In the payload portion, data from elementary video/audio stream (mpeg-2 or mpeg-4 encoded) is stored.

According to this embodiment, each payload portion of a PES packet is referenced by a reference record 62 being part of a track atom 60.

In other words, the track atom 60 comprises reference records 62, each record 62 referencing the payload portion of one PES packet. Particularly, the reference record 62 comprises the start and end address of the respective payload portion. By using these references, it is possible to playback the movie represented by the data contained in the payload portions of all PES packets.

As the mp4-container's reference records 62 of the track atom 60 always reference entire samples (frames), all audio/video PES packets must contain at least one complete frame. This requirement is indicated by arrow 32 and the term "n frames", wherein n is an integer. This requirement must be accounted for upon creation of the content.

With respect to the DVD-player, demultiplexers must be implemented to be robust against large PES packets. If necessary, enough buffer space must be provided for demultiplexing to succeed.

As different frames have different sizes, the alignment of audio/video PES packets to a 2048 Bytes boundary is not feasible any more (padding would need to be inserted after each A/V PES packet). To prevent this alignment problem from having a negative impact on seeking performance, all navigation packs, which are part of the video object units VOBUs, must be padded to a 2048 Bytes boundary.

Referring back to FIG. 2, it is shown that the header of a PES packet reserves two bytes for storing the PES packet length. This means that the maximum size of a PES packet is 65,531 bytes. For high-definition content, this may not be sufficient to store a complete frame, so referencing the same content from the mp4-container track 60 may not be possible.

Figure 7:
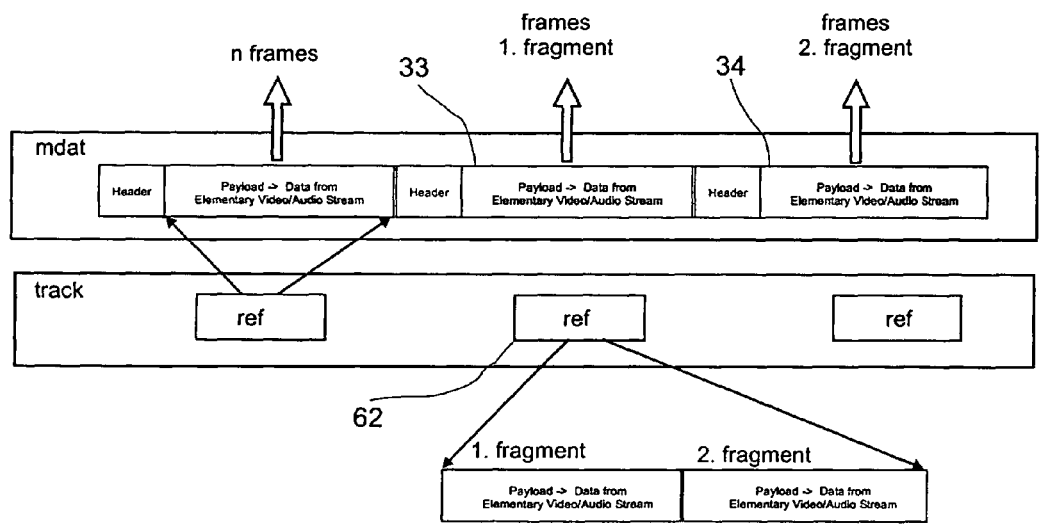
FIG. 7 schematically shows the "mdat" atom and the track atom of FIG. 6, wherein the payloads of two PES packets are stored in addition to the respective PES packets.

To overcome this deficiency, the payload portions representing fragments of a frame are stored twice. This approach is schematically shown in FIG. 7. Here, PES packets 33, 34 contain only fragments of one frame, namely a first fragment in the payload portion of PES packet 33 and a second fragment in the payload portion of the PES packet 34. The first fragment and the second fragment together represent one frame.

Both payload portions and the data stored therein, respectively (raw audio/video (A/V) data) is stored additionally and in a contiguously manner. The reference record 62 now references to raw A/V data and not to the payload portions of both PES packets 33, 34.

Most of the video content offered for downloading via Internet carries a digital rights management as to guarantee that the content is not illegally copied, played, etc. One part of the digital rights management is content encryption. In the present embodiment, content encryption takes place using a storage key per title (movie) which can be obtained from a license server. This key resembles the unique key used in the VCPS (video content protection system) specification. Cryptographic binding of content to a medium does not require content file to be modified, only its license information needs to be stored somewhere on the medium, encrypted using a key derived from the unique medium ID. This key is stored in licenses.

The previously mentioned Nero Digital DRM format supports enabling/disabling of copy protection on a per unit (DVD-video VOBU) basis. This allows real-time recording supporting the broadcast flag (DVB, digital video broadcasting), dynamically enabling/disabling copy protection as requested by the content provider (broadcasting station).

DVD-video navigation packs (NV_PCKs) shown in FIG. 2 store the program key that is used to encrypt A/V PES packets as well as settings specifying a copy control information. The program key itself is encrypted using the unique key designated for this movie. Encryption is done in analogy to the VCPS technology used for cryptographically binding content to a physical medium.

In other words, the payloads assigned to a group of pictures may be decoded or decrypted by the program key stored in the navigation pack assigned to the same VOBU. The payloads of the PES packets assigned to the next VOBU are then encrypted by another key stored in the navigation pack of this video object unit.

Figure 8:
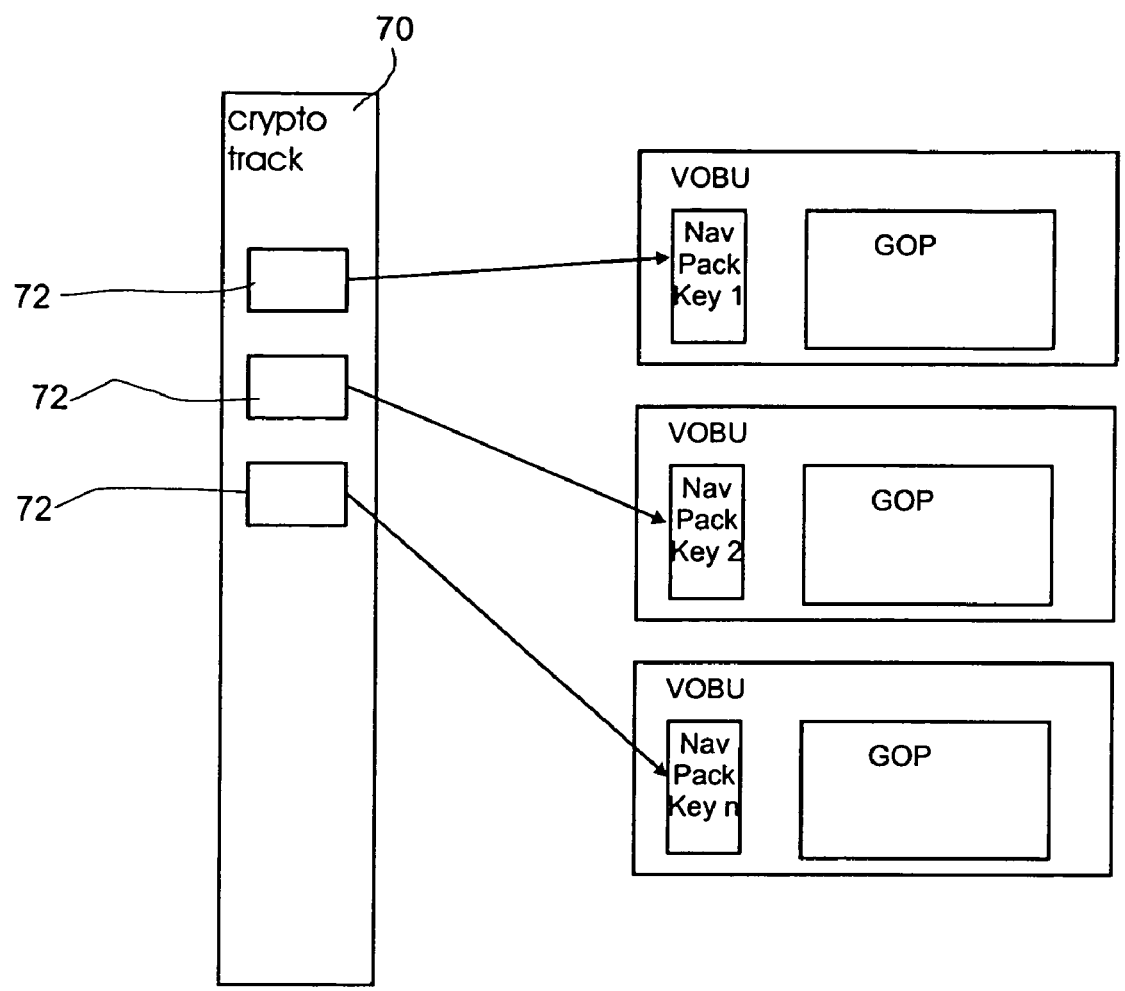
FIG. 8 schematically shows a crypto track atom referencing to navigation packs which are part of video object units.

In FIG. 8, a schematic diagram is shown illustrating three video object units, each containing a navigation pack and a group of pictures which, in turn, comprise the PES packets to be decoded.

In order to guarantee that a DVD-player is able to decode the PES packets even if it does not support rich content, the mp4-container 40 comprises a further atom called crypto track atom 70. This crypto track atom 70 contains reference records 72 (forming a reference table), each reference record 72 referencing a navigation pack of a VOBU. This reference table allows to obtain the program keys stored in the navigation packs in order to decode the PES packets (which are also referenced by reference records 62).

On the basis of the track atom 60 and the crypto track atom 70, it is possible to reconstruct or rebuilt the audio/video stream for playback, even if the DVD-player does not support rich content. Both track atoms 60 and 70 are part of the "moov" atom of the mp4-container.

Hence, DVD-video devices (for example Nero Digital DRM-enabled devices) not supporting rich content presentation must rely on this crypto track atom 70 to obtain the proper keys for the encrypted content. Players supporting rich content, however, may ignore the crypto track atom 70 and harvest key information as part of DVD navigation, when reading the DVD-video navigation packs.

Navigation packs have a fixed size of 2048 Bytes. The crypto track atom 70 referenced by the mp4-container shall carry the track type (atom HDLR/TYPE) "NDRM", name (atom HDLR/NAME) "Nero digital DRM". The reference table (crypto track 70) shall contain one entry for each navigation pack of the recording, regardless of whether the recording is actually protected or not. In contrast to audio and video data referenced by the mp4-container, the NDRM track shall include pack header, system header and pack headers of the navigation pack.

Generally, the afore-mentioned mp4-container file may be copied onto a compact disc or a DVD medium. For playback compatibility, the file system is created as a DVD-video compliant UDF1.02 file system with a few modifications. In contrast to DVD-video media, no ISO9660 file-system shall be created for the medium storage if any of the mp4-container files is larger than 2 Gigabytes.

Since the data structure described above stores all content within one single file, the limitation of DVD-video file systems in respect to the maximum size of files (no file-entry relevant for DVD-video playback may feature more than one fragment) will be replaced by the rule that any number of fragments per file entry is allowed but fragments have to be physically adjacent (contiguous). So basically, no fragmentation of the mp4-container files according to the present invention is allowed on optical storage media.

This allows for very simple file system driver stacks to be deployed on Nero digital-DRM capable CE devices, decreasing development costs and time to market.

Figure 9:
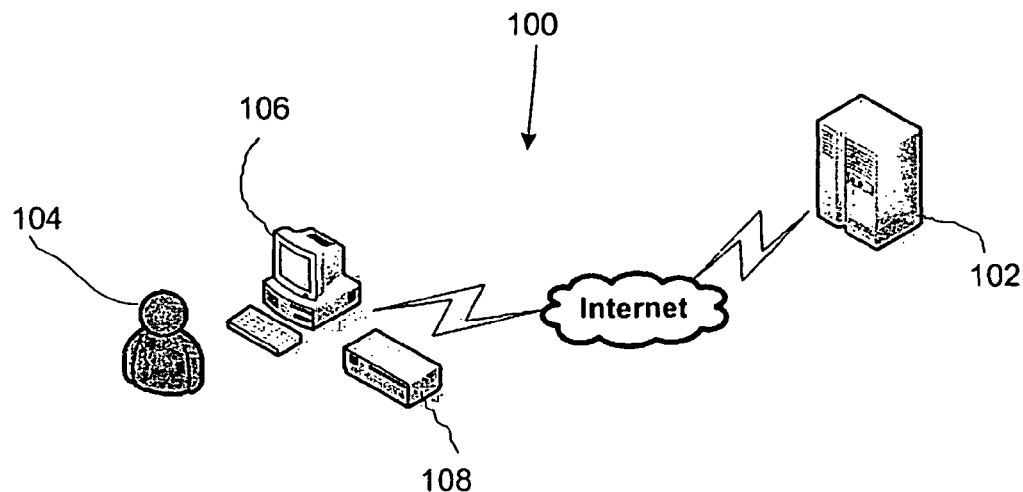
FIG. 9 schematically shows a system for providing and using DVD-Video content.

In FIG. 9, a system for using the above-mentioned data structure, namely the mp4-container format, is shown. The system 100 comprises a server 102 which offers video content for downloading. Further, the server 102 converts video content provided in the DVD-video format into the above-mentioned mp4-container data structure. This conversion, for example, comprises the method described with reference to FIG. 1, namely to build one single file 20 containing all DVD-video files. Further, the server 102 serves to build up the reference tables of the track atom 60 and the crypto track atom 70. Of course, the server 102 may also serve as a license server providing the license key for decrypting the program keys stored in the navigation packs.

An mp4-container file offered by the server 102 may be downloaded by a user 104 via the Internet and may be stored on a computer 106 or a DVD-player 108. The computer 106 or the DVD-player 108 are adapted to process the mp4-container file as to playback the movie.

Figure 10:
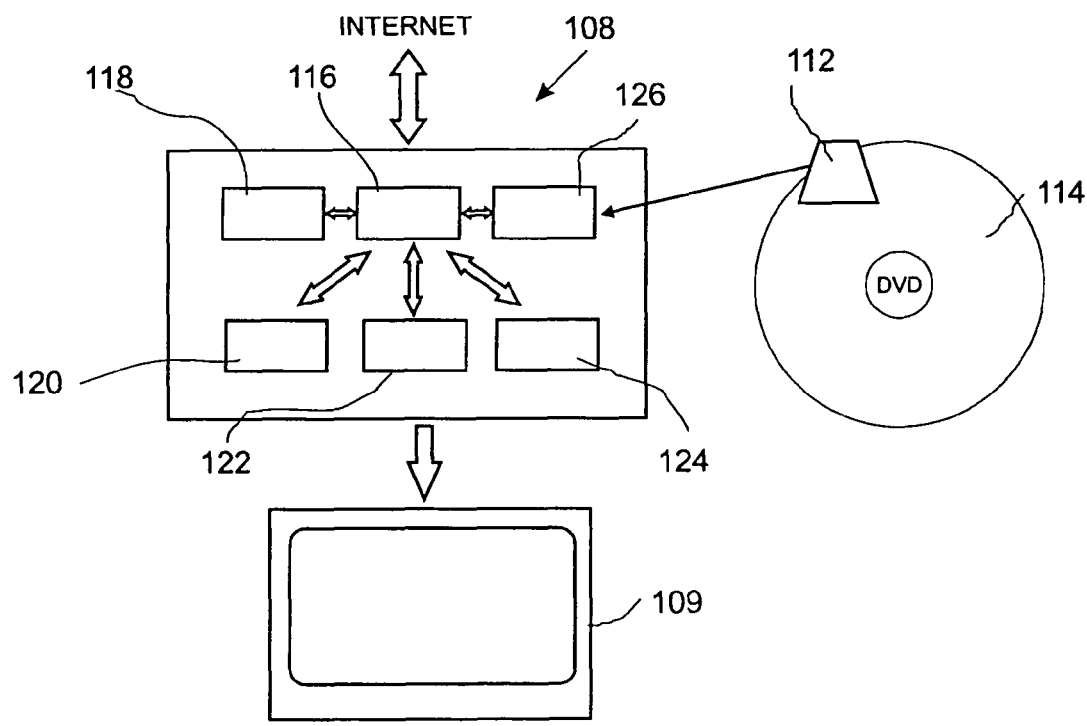
FIG. 10 shows a block diagram of a DVD-apparatus.

In FIG. 10, a block diagram of a DVD-player 108 is schematically shown. The DVD-player 108 may be coupled with the Internet and is coupled with a monitor 109 for displaying a movie.

The DVD-player 108 comprises a read unit 112 provided for reading the digital data stored on a DVD medium or a CD-ROM media 114.

The read data is processed by a processor unit 116. Coupled with the processor unit 116 is a decoding unit 118 adapted to decode mpeg-2 or mpeg-4 encoded data, and a separation unit 120 adapted to separate the set of data files stored in said single file 20.

The DVD-player 108 further comprises a first referencing unit 122 adapted to read the referencing data contained in the track atom 60 and to read the video/audio data contained in the referenced PES packets.

The DVD-player 108 also comprises a second referencing unit adapted to read the referencing data contained in said crypto track atom 70 and to read the key data contained in the referenced navigation packs of each VOBU. Coupled with the second referencing unit 124 is a decoding unit 126 adapted to decode the read video/audio data of a VOBU by using the read key data assigned to said VOBU.

To sum up, the video content storage format described above meets the following desirable goals for both content producers and content consumers, namely easy access to content: the described video content is contained in a single file that can be shared over peer-to-peer networks or downloaded from web pages;

the DRM protected content can be produced from any ready for sale DVD-video medium, conversion to the above-mentioned format is possible without losing menu and user interaction (called rich content);

by using existing technologies in a new way, CE device manufacturers can combine the existing DVD-video navigation frameworks with the existing Nero digital compliant hardware mpeg-4 decoders and get rich content support with little extra effort;

rich content at superb quality combined with quick downloads and little space consumption by taking the best of both mpeg-4 and DVD-video; and rich content is embedded into an mp4-container referencing the main movie title. Thus, playback of main movie is guaranteed, even if menus are not supported by the player.

Figure 11A:
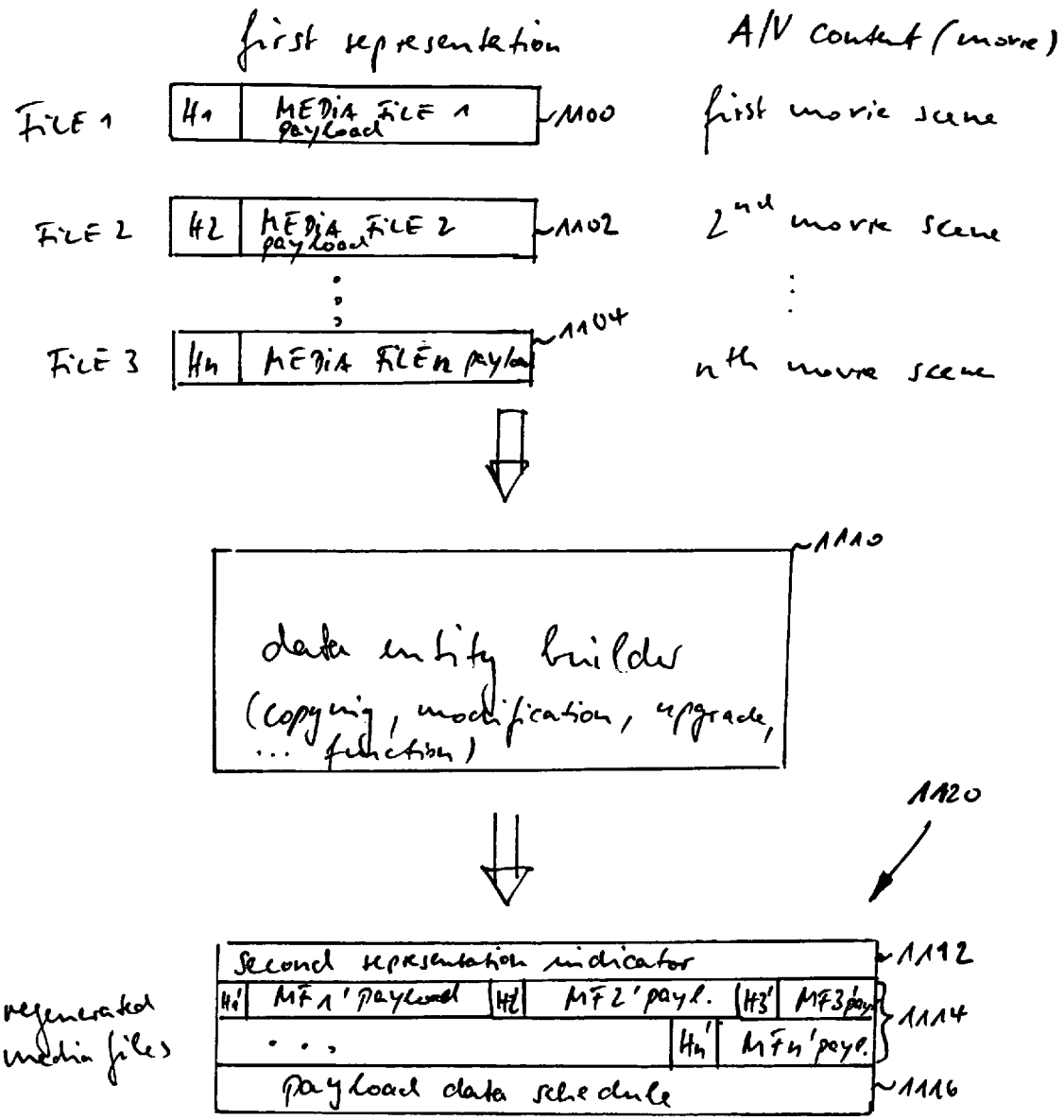
FIG. 11a illustrates a schematic diagram of an inventive apparatus for converting the first representation into the second representation.

FIG. 11a illustrates a schematic representation of an inventive apparatus for converting a first representation of a media content into a second representation of a media content. Exemplarily, the first representation is a DVD representation, while the second representation is an MPEG-4 conforming representation. Generally, the first representation includes one or more media files 1100, 1102, 1104. Each media file includes a payload portion indicated as "media file payload" in FIG. 11a, and a control part indicated as header H1, H2 or Hn in FIG. 11a. As an example only, each media file can represent a scene of a movie. So, the first media file 1100 can include the audio/video content of a first scene, the second file 1102 can include an audio or video content of a second video or audio scene, etc. Generally, each media file has media file payload representing the media content of the media file and a media file control part including control information for the associated media file payload of the media file.

Figure 13:
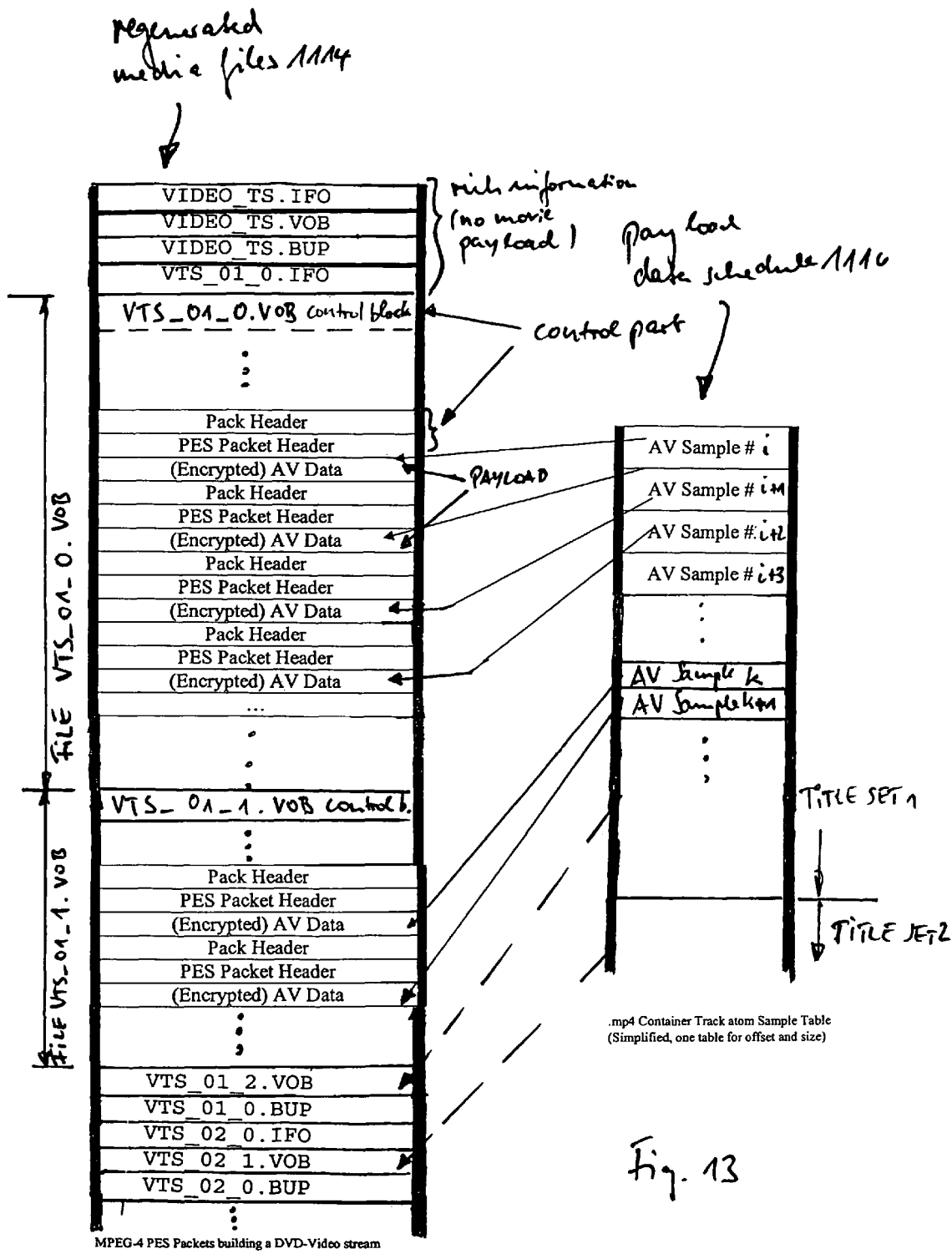
FIG. 13 illustrates a schematic diagram of the data entity having the regenerated media files/payload blocks and associated the payload data schedule information.

Generally, the first representation of the media content can be a file set having at least two files, each file having a header block and a payload block as illustrated in FIG. 11a for file 1100 and 1102. Alternatively or additionally, the first representation can be a single file or more files, each file having at least two payload portions separated by a control part. An example for this alternative is illustrated in FIG. 2, where the file is the video object file (VOB), which includes several parts of payload information, since the file includes several audio program elementary streams or video program elementary streams. Alternatively, such a single file has payload blocks separated by control information blocks as illustrated in FIG. 13 as the file VTS_10_0.VOB or VTS_011_1.VOB.

The inventive apparatus includes a data entity builder 1110 for generating a data entity, the data entity being the second representation of the media content. In accordance with the present invention, the data entity builder 1110 is operative to generate a second representation indicator indicating a data entity type of the second representation. Such a second representation indicator is, for example, an indicator that the data entity is an MP4-file, i.e., a file or a data entity written in accordance with the MPEG-4 standard which is also known as international standard ISO/IEC 14496-1:2002.

The second representation indicator is indicated at 1112 in FIG. 11a. Furthermore, the data entity builder 1110 is operative to regenerate the at least one media file so that the regenerated media file includes a regenerated media file control part and a regenerated media file payload representing the media content of the first representation media file. Generally, the media content represented by the regenerated media file is the same media content represented by the regenerated media file. The regenerated at least one media file is illustrated at 1114 in FIG. 11a. In a preferred embodiment of the present invention, the at least one regenerated media file has the same file structure as the first representation media file. In an embodiment, the regenerated media file MF1' corresponding to media file 1 1100 is simply copied into a newly generated data entity. Alternatively, the payload part of media file 1100 which, for example, is related to an older decoder, can be substituted by an encoded media file payload relating to the same movie scene but being generated using a different and preferably qualitatively better encoder/decoder version. Nevertheless, media file payload in the first representation media file and the regenerated second representation media file have the media content of the same scene in a movie for example or in an audio piece.

Analogously, header or control data can be amended by the data entity builder. An example for an amendment or modification of the control data is, for example, adding information relating to the data entity builder 1110 or adding additional metadata, etc. In a preferred embodiment, however, the control block for example H1' may not be amended to the extent that the generated media files within the newly generated data entity cannot be used anymore for being played by a DVD recorder, when the first representation is a DVD representation. So, the present invention preferably regenerates the at least one media file such that the at least one regenerated media file obeys the same format requirements, which are also valid for the first representation media file or the plurality of first representation media files.

Additionally, the data entity builder 1110 is operative to generate a payload data schedule 1116, the payload data schedule having schedule information indicating, for each regenerated media file, the start of the payload information in the regenerated media file. When the regenerated media file includes several blocks of payload information separated by control data, then the payload schedule is generated by the data entity builder 1110 such that the start of each block of payload data can be derived using the payload data schedule

1116. The data entity 1120 is, preferably, a single data file, which can be stored or transmitted from a provider to a recipient. Additionally, it is to be noted that the data entity 1120 does not have to be a physical file, but can also include references to additional places as allowed by the MPEG-4 standard. Thus, the data entity 1120 is to be seen as a logical construct or a logical construct or a logical container including data parts 1112, 1114 and 1116.

FIG. 12 illustrates a preferred embodiment of the payload data schedule for the case, in which there are several first representation media files, each file having a control part preferably in a header and a payload part. In this case, the payload data schedule preferably includes a start address of the payload of the first regenerated media file 1200, a start address of the payload part of the second regenerated media file 1202 until a start address of the $n^{th}$ regenerated media file payload part.

These addresses indicated in the table in FIG. 12 can be relative or absolute addresses of the storage medium, on which the newly generated data entity is stored. Alternatively, the addresses can be logic addresses separated from any storage medium and, preferably, related to the start of the data entity or to any reference point of the data entity known to the decoder.

Alternatively, the payload data schedule is written such that the table entries do not indicate a start address of a payload block but indicate an end address of a preceding control data block or indicate a start address of a preceding control data block and the size of any intervening the control data block. When the size of the control data block is known to the decoder (for example all control data blocks have the same size), then it is sufficient to only give a start address or an end address of the control data blocks so that a data decoder requiring chunked media data can skip the control data when processing the media content.

FIG. 11*b* illustrates a preferred embodiment of a media processor for processing a data entity as discussed in connection with FIG. 11*a*. The data entity 1120 is input into a demultiplexer device 1130, which can also be regarded as a data stream parser. The data stream parser processes the data entity and outputs the payload data schedule at a payload data schedule channel 1132 and outputs the regenerated media file via a media file channel 1134. Preferably, the demultiplexer 1130 is further operative to output a decoder type indication at a corresponding output channel 1136. The payload data schedule 1132 is input into the payload data schedule reader 1138, which controls a payload data decoder 1140. The payload data decoder receives the regenerated media files and outputs the decoded media content. The mode control input 1142 preferably has two modes. In mode 1, the payload data decoder 1140 is controlled such that the decoder uses the payload data schedule for skipping control parts within the regenerated media files. Thus, the mode 1 control is used, when the payload data decoder is an MPEG-4 conforming device, which cannot process any control blocks interspersed between payload data blocks, but which relies on chunked data not being separated by control data blocks.

When the mode control input 1142 is set to mode 2, then the payload data schedule is ignored and the control parts are used. A mode 2 decoder would be a typical DVD decoder, which reads the regenerated media files as they are, which, therefore, does not have to know any MPEG-4 syntax, but which can simply read and process the part 1114 of the data entity 1120 in FIG. 11*a*.

Subsequently, a preferred embodiment of the present invention for converting a DVD format or representation (MPEG-4 Representation) into an MPEG-4 format or representation is illustrated in connection with FIG. 13. The left part of FIG. 13 illustrates the generated media files 1114, while the right hand side of FIG. 13 illustrates the payload data schedule 1116. In the DVD example, the first group of files of the FIG. 1 embodiment is written. Then, the first video object file relating to the first movie scene or the first group of movie scenes is written. This object file includes in this embodiment several control parts such as the first control block or header and, for each PES packet, a pack header and a PES packet header. Then, after each pack header and PES packet header, the preferably encrypted audio or video data is written. In an audio example, these audio data would be output data of an audio encoder related to a certain time portion of an audio piece. In the video example, payload block titled "encrypted audio video data" includes video data on a group of pictures. Thus, the regenerated media files 1114 constitute an MPEG-4 PES packets collection building a DVD video stream.

The payload data schedule 1116 includes information on each payload block or sample so that the generated media file 1114 can be processed using the payload data schedule 1116 in order to skip each and every control block so that the decoder only receives the payload blocks as required, for example, by MPEG-4.

An MPEG-4 file is illustrated in FIG. 14. FIG. 14 and the subsequent FIGS. 15 to 17 are all derived from section 13 of the MPEG-4 standard illustrating the file format of an MP4 file. Generally, an MP4 file includes several atoms. The main atoms in a file are the moov atom and the mdat atom. The moov item is indicated at 1400 in FIG. 14, and the mdat atom is indicated at 1402 in FIG. 14. The moov atom 1400 can include, in a certain hierarchical order, several further atoms, which are shown in the table of FIG. 15 giving an overview of the atom encapsulation structure of the MPEG-4 standard. In accordance with the present invention, the regenerated media files 1114, as, for example shown in FIG. 13 are introduced into the mdat atom 1402 in FIG. 14, while the payload data schedule 1116 in FIG. 13 is included into the moov atom 1400. Subsequently, it will be shown, which atoms in the moov atom receive the payload data information, i.e., the indication for a start of a payload block for each audio or video sample. Particularly, the sample table atom illustrated in section 13.2.3.15 of the standard.

The sample table contains all the time and data indexing of the media samples in a track. Using the tables, it is possible to locate samples in time, determine their type and determine their size, container and offset into that container. If the track that the sample table atom is contained in thus reference data, then the following sub-atoms are required: Sample description, sample size, sample to chunk and chunk offset.

All of the sub-tables of the sample table use the same total sample count. Further, the sample description atom should contain at least one entry. A sample description atom is required because it contains the data reference index field that indicates which data reference atom to use to retrieve the media samples. Without the sample description, it is not possible to determine where the media samples are stored.

FIG. 16 illustrates the sample to chunk atom, and FIG. 17 illustrates the chunk offset atom and the corresponding description. Particularly, the sample to chunk atom gives the mapping of which chunk data in the mdat atom corresponds to which sample. Particularly, in its normal MPEG-4 use, the mdat atom includes data for several tracks, wherein, for each track, a single entry should be sufficient, since each entry in the table mentioned in section 13.2.3.19 identifies a run of chunks with the same characteristics, which is normally the case for a track.

However, this possibility of the MPEG-4 syntax is "misused" for the present invention, since the start of the payload data block is, in accordance with the present invention, signaled as start of a new "run of chunks" or a new "track", although, in the FIG. 13 embodiment, there is only a single payload block "(encrypted) AV data". Thus, the payload data schedule 1116 in FIG. 13 can be seen as a schematic representation of the table in the sample to chunk atom. In a preferred embodiment, however, the chunk offset atom is also used. Generally, the start of a payload data block is given by an entry into the table, since, as outlined in the third paragraph of section 13.2.3.19 in FIG. 16, each entry has an index of the first chunk of a run of chunks with the same characteristics. Thus, in accordance with the present invention, each audio video data block constituting the payload in FIG. 13 is treated as a run of chunks, wherein this run only has a single chunk, i.e., a PES packet payload included in a PES packet.

Depending on certain implementation requirements of the inventive methods, the inventive methods can be implemented in hardware or in software. The implementation can be performed using a digital storage medium, in particular a disk, DVD or a CD having electronically readable control signals stored thereon, which cooperate with a programmable computer system such that the inventive methods are performed. Generally, the present invention is, therefore, a computer program product with a program code stored on a machine readable carrier, the program code being operative for performing the inventive methods when the computer program product runs on a computer. In other words, the inventive methods are, therefore, a computer program having a program code for performing at least one of the inventive methods when the computer program runs on a computer.

Those skilled in the art can now appreciate from the foregoing description that the broad teachings of the present invention can be implemented in a variety of forms. Therefore, while this information has been described in connection with a particular example thereof, the true scope of the invention should not be so limited, since other modifications will become apparent to the skilled practitioner upon a study of the drawings, specification and the claims.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. An apparatus for converting a first representation of a media content into a second representation of the media content, the first representation including a media file having at least two media file payload blocks separated by a media file control block or at least two media files each media file having a media file payload block and a media file control block, the media file payload blocks representing the media content, the media file control blocks including control information for associated media file payload blocks, comprising:
 a data entity builder for generating a data entity, the data entity being the second representation of the media content, the file builder being operative:
  to regenerate the one or more media files so that in a regenerated media file or in regenerated media files a regenerated media file control block is located between two regenerated media file payload blocks; and
  to generate a payload data schedule, the payload data schedule having schedule information indicating, for each regenerated media file payload block, a start of payload information of the regenerated media file payload block, wherein the first representation is a media content as stored on a DVD, and wherein the second representation is an MPEG-4 conforming data entity,
 wherein the payload data schedule is included in an moov atom, and
 wherein the at least one media file is included in an mdat atom.

2. The apparatus in accordance with claim 1, in which there exists a plurality of media files having a predetermined order determined by the media content, and in which the data entity builder is operative to regenerate such that the regenerated media files also have the predetermined order.

3. The apparatus in accordance with claim 1, in which the data entity builder is operative to concatenate the regenerated media files so that, with respective to a data sequence within the data entity, a control block for a regenerated media file is located between two regenerated media file payloads.

4. The apparatus in accordance with claim 1, in which the payload data schedule is included in a sample table atom included in the moov atom.

5. The apparatus in accordance with claim 4, in which the data entity builder is operative to input the payload data schedule into a sample to chunk atom included in the sample table atom.

6. The apparatus in accordance with claim 4, in which the data entity builder is operative so signal each payload data block as a new track in the payload data schedule.

7. The apparatus in accordance with claim 1, in which the data entity has an address structure including relative addresses related to a start point of the data entity, and in which the data entity builder is operative to generate the payload data schedule such that a relative address, at which a regenerated payload block begins, is included in the payload data schedule.

8. The apparatus in accordance with claim 1, in which there exists a plurality of media files, in which the data entity builder is operative to regenerate the plurality of regenerated media files such that the files are concatenated to each other, and to generate the payload data schedule such that the payload data schedule is included in the data entity separate from the regenerated media files.

9. The apparatus in accordance with claim 1, in which the data entity builder is operative to copy the at least one media file when generating the at least one regenerated media file.

10. The apparatus in accordance with claim 1, in which the data builder is operative to change an encoding format when regenerating the at least one regenerated media file.

11. The apparatus in accordance with claim 1, in which the data entity builder is operative to modify the control information when regenerating the at least one regenerated media file.

12. The apparatus in accordance with claim 1, in which the regenerated media file includes a video object file belonging to a title set, the video object file having a sequence of packs, each pack having a pack header and a program elementary stream (PES) packet, the PES packet having a PES packet header and a PES payload data block, each PES data block including an audio or video data of a group of pictures, and in which the data entity builder is operative to generate the regenerated media control block such that the regenerated media control block of the video object file includes a pack header and a PES packet header as the control block and the PES payload data block as the payload data block, and in which the data entity builder is operative to generate the payload data schedule such that a beginning of the PES payload data block is indicated.

13. The apparatus in accordance with claim 1, in which the data entity builder is operative to generate at least one additional file not including information on the media content, and in which the data entity builder is further operative to generate the payload data structure such that the payload data structure does not reference the at least one additional file.

14. The apparatus in accordance with claim 1, in which the data entity builder is operative to regenerate the regenerated media file such that at least part of the payload of the regenerated media file is encrypted.

15. The apparatus in accordance with claim 1, in which the data entity builder is operative to place the at least one regenerated media file into an mdat atom, and in which a logical start address of the mdat atom relative to the start address of the data entity is aligned on a byte boundary raster.

16. The apparatus in accordance with claim 15, in which the data entity builder is operative to regenerate the at least one media file such that the file starts on a logical address being adjacent to a byte raster point relative to the start address of the data entity, and wherein a space between a start address of the mdat atom and the start address of the data of the single entity is padded with zeros.

17. A method of converting a first representation of a media content into a second representation of the media content, the first representation including a media file having at least two media file payload blocks separated by a media file control block or at least two media files each media file having a media file payload block and a media file control block, the media file payload blocks representing the media content, the media file control blocks including control information for associated media file payload blocks, comprising:
generating a data entity, the data entity being the second representation of the media content,
regenerating the one or more media files so that in a regenerated media file or in regenerated media files a regenerated media file control block is located between two regenerated media file payload blocks; and
generating a payload data schedule, the payload data schedule having schedule information indicating, for each regenerated media file payload block, a start of payload information of the regenerated media file payload block, wherein the first representation is a media content as stored on a DVD, and wherein the second representation is an MPEG-4 conforming data entity,
wherein the payload data schedule is included in an moov atom, and
wherein the at least one media file is included in an mdat atom.

18. An MPEG-4 conforming data entity representing a media content, the data entity comprising: a representation indicator identifying a data entity type; a regenerated media file or a plurality of regenerated media files, in which a regenerated media file control block is located between two regenerated media file payload blocks; and a payload data schedule, the payload data schedule having schedule information indicating, for each regenerated media file payload block, a start of payload information of the regenerated media file payload block, wherein the payload data schedule is included in an moov atom, and wherein the at least one media file is included in an mdat atom.

19. A non-transitory computer-readable medium having stored a computer program for performing, when running on a computer, the method of converting a first representation of a media content into a second representation of the media content, the first representation including a media file having at least two media file payload blocks separated by a media file control block or at least two media files each media file having a media file payload block and a media file control block, the media file payload blocks representing the media content, the media file control blocks including control information for associated media file payload blocks, comprising generating a data entity, the data entity being the second representation of the media content, regenerating the one or more media files so that in a regenerated media file or in regenerated media files a regenerated media file control block is located between two regenerated media file payload blocks; and generating a payload data schedule, the payload data schedule having schedule information indicating, for each regenerated media file payload block, a start of payload information of the regenerated media file payload block, wherein the first representation is a media content as stored on a DVD, and wherein the second representation is an MPEG-4 conforming data entity, wherein the payload data schedule is included in an moov atom, and wherein the at least one media file is included in an mdat atom.

* * * * *